United States Patent [19]

Law

[11] 3,954,677
[45] May 4, 1976

[54] SULFONATED AROMATIC-FORMALDEHYDE CONDENSATION PRODUCTS
[75] Inventor: Robert E. Law, Houston, Tex.
[73] Assignee: Nalco Chemical Company, Oak Brook, Ill.
[22] Filed: Nov. 18, 1974
[21] Appl. No.: 524,784

[52] U.S. Cl. .......................... 252/355; 106/308 N; 106/308 S; 260/505 R
[51] Int. Cl.² ........................................ B01F 17/00
[58] Field of Search ......... 260/505 E, 505 S, 505 C, 260/505 R, 96.5 U; 252/355

[56] References Cited
UNITED STATES PATENTS
2,588,602   3/1952   Adams et al. .................. 260/96.5 U
3,067,243   12/1962  Richter et al. .................. 260/505 C
3,193,575   7/1975   Nebel et al. ..................... 260/505 C OTHER PUBLICATIONS
Hattori, "Chemical Abstracts", Vol. 74, (1971), p. 90764g.

Hattori, "Chemical Abstracts", Vol. 67, (1967), p. 67353u.

Primary Examiner—James O. Thomas, Jr.
Assistant Examiner—A. Siegel
Attorney, Agent, or Firm—Johnston, Keil, Thompson & Shurtleff

[57] ABSTRACT

Sulfonated aromatic-formaldehyde condensation products are prepared by reacting a sulfonated aromatic compound with formaldehyde to form a condensation product which is neutralized or rendered alkaline by the addition of an aqueous solution of sodium hydroxide and further reacted with a small amount of urea, usually around 0.5 to 1% by weight of the total mass in order to produce a product which can be employed as a dispersant for oil well cementing compositions and exhibits less retardant effect than a similar dispersant prepared without the addition of the urea.

5 Claims, No Drawings

SULFONATED AROMATIC-FORMALDEHYDE CONDENSATION PRODUCTS

BACKGROUND

It is well known in the art to prepare aromatic sulfonic acids such as, for example, naphthalene sulfonic acids, naphthol sulfonic acids, alkylated naphthalene and alkylated naphthol sulfonic acids as well as toluene sulfonic acids, benzene sulfonic acids, phenol sulfonic acids, and the like, which can be condensed with formaldehyde to produce higher molecular weight water soluble sulfonic acids that are useful as dispersants. One use for such dispersants is as an additive for oil wel cementing compositions in order to lower the viscosity, make it possible to use less water and to obtain more uniform mixtures with fewer gaps or holes when the cement sets. However, condensation products of this type when used as dispersants tend to retard the setting of the cement, possibly due to the presence of free formaldehyde which is a known retardant or possibly for some other reason.

OBJECTS

One of the objects of the present invention is to provide sulfonated aromatic-formaldehyde condensation products of the type described which can be employed as dispersants for oil well cementing compositions and which have a lower retardant effect on the setting of cement than compositions of this type heretofore in use.

Another object of the invention is to provide a new and improved process for producing compositions of the type described whereby the properties of the compositions are improved in a very simple manner. Other objects will appear hereinafter.

BRIEF SUMMARY OF THE INVENTION

Sulfonated aromatic-formaldehyde condensation products are prepared by reacting a sulfonated aromatic compound with formaldehyde to form a condensation product which is neutralized or rendered alkaline by the addition of an aqueous solution of sodium hydroxide and further reacted with a small amount of urea, usually around 0.5 to 1% by weight of the total mass in order to produce a product which can be employed as a dispersant for oil well cementing compositions and exhibits less retardant effect than a similar dispersant prepared without the addition of the urea.

DETAILED DESCRIPTION OF THE INVENTION

Sulfonated aromatic-formaldehyde condensation products are well known in the art and have been used for many years as dispersants. The aromatic sulfonates can be prepared by sulfonating aromatic compounds such as, for example, alpha-naphthol, beta-naphthol, naphthalene, toluene, benzene, phenol, methyl, ethyl, isopropyl and butyl naphthalenes and alkylated benzenes containing, for example 1 to 8 carbon atoms in the alkyl substituent groups.

Depending upon the particular starting material, the sulfonation reaction can introduce a single sulfonic acid group into the aromatic nucleus or two or more sulfonic acid groups. Thus, as disclosed by Fieser & Fieser, Advanced Organic Chemistry, 1961, page 898, sulfonation of beta-naphthol with sulfuric acid having a concentration of 94% $H_2SO_4$ at 95°C. results primarily initially in the production of 2-naphthol-1-sulfonic acid which rearranges to the 8-sulfonic acid but at steam bath temperatures rearranges to 2-naphthol-6-sulfonic acid. This is accompanied by the formation of 6,8- and 3,6-disulfonic acids. Accordingly, the sulfonation products are largely mixtures of various sulfonic acids containing principally monosulfonic acids. Similarly mixtures are obtained in the sulfonation of other aromatic compounds of the type described. In the practice of the invention any of these sulfonation products can be used as starting materials.

The condensation of formaldehyde with aromatic sulfonates of the type described is also well known in the art. It is generally believed that the formaldehyde cross links to produce higher molecular weight water soluble sulfonic acids in which the aromatic nuclei are connected by methylene bridges. For the purpose of the present invention the condensation products of formaldehyde and the aromatic sulfonic acids will usually have an average molecular weight within the range of 1000 to 1600, although this is subject to variation depending upon the initial aromatic compound.

In condensing the aromatic sulfonic acid with formaldehyde it is usually desirable to use around 0.7 mole to 1 mole of formaldehyde per mole of aromatic sulfonic acid, and in most cases the molar ratio of formaldehyde to aromatic sulfonic acid should be less than 1:1, preferably around 0.9:1.

The condensation can be carried out using 37% aqueous formaldehyde or another source of formaldehyde. Initially, the reaction between the formaldehyde and the aromatic sulfonic acid is exothermic which will cause the temperature to be raised to around 90°C. to 100°C. and the reaction mass is preferably maintained at this temperature for at least six hours after which water is added, the reaction mass is neutralized to a pH of 7 to 9 with sodium hydroxide, and additional water is added to adjust the product activity (i.e., the content of aromatic-formaldehyde condensate sulfonate) to 25 to 35% by weight. At this point urea is added in a small amount which usually is within the range of 0.5 to 1% urea based on the total mass and the resultant mixture is heated to a temperature of at least 70°C., preferably within the range of 70° to 90°C., for a period of at least two hours, preferably 2 to 4 hours. Based on the amount of sulfonate in the mixture the quantity of urea is usually within the range of 1% to 5% by weight of the sulfonate.

It will be understood that the weight percentage of sulfonate in the final product can vary depending upon the solubility of the sulfonate and the intended use. For most practical purposes, however, a concentration of 25% by weight active material has been found to be satisfactory.

An important use of products prepared in accordance with the invention is as dispersants for oil well cementing compositions. These compositions are well known in the art and consist essentially of portland cement and sand with or without aggregate and other ingredients. It is well known in the art that formaldehyde has a retardant effect on the setting of cement compositions of this type and to some extent the same effect characterizes the condensation products of formaldehyde and aromatic sulfonic acids. The addition of the urea as disclosed herein results in a dispersant which can be added to oil well cementing compositions in order to disperse them and reduce viscosity with less retardation in the setting of the compositions as compared to the same compositions to which no urea has been added.

While the invention is not limited to any explanation or theory, it is believed that the urea functions as a scavenger to remove any formaldehyde which may be present in the free state or loosely bound to the aromatic sulfonic acid-formaldehyde condensation product molecules.

The invention will be further illustrated but is not limited by the following example in which the quantities are given in parts by weight unless otherwise indicated.

EXAMPLE

Three hundred parts of a 55% beta-naphthol sulfonic acid solution prepared by heating equal parts by weight beta-naphthol and 98% sulfuric acid for approximately 3 hours at 100°–150°C. with subsequent cooling and addition of sufficient water to make 55% by weight solution were charged into an agitator equipped one liter threeneck flask. Heat was applied and at 65°–70°C., 54 parts of 37% aqueous formaldehyde (0.9 mole formaldehyde per mole beta-naphthol sulfonic acid) was added. An exotherm resulted raising the temperature to 90°–100°C., and the reaction mass was maintained at 90°–100°C. for 6–8 hours and 150 parts water added.

After cooling, the reaction mass was neutralized to a pH of 8 to 9 with 113 parts 50% sodium hydroxide solution and 191 parts water added to adjust the product activity to approximately 25%. Two hundred parts of the 25% active product were removed as untreated condensate from the flask and 3 parts urea added to the remaining flask contents. Heat was applied and the flask contents held at 70°–85°C. for 2–3 hours to yield 577 parts of the urea-treated beta-naphthol sulfonic acid-formaldehyde condensate sodium salt.

The untreated condensate and the urea treated condensate were tested by adding 0.5% by weight of each to oil well cementing compositions in order to reduce the viscosity. It was observed that the urea treated dispersant was superior especially in its lower retardant effect on the setting of the cement.

In the example, sodium hydroxide solution has been used as a neutralizing agent because it is the most readily available and least expensive material for this purpose. However, the process can be carried out with potassium hydroxide and any other neutralizing agent which does not destroy the water solubility of the product.

While the foregoing example represents the best mode contemplated for the practice of the invention similar results are obtained by using other starting materials such as, for example, sulfonated alpha-naphthol, sulfonated naphthalene, sulfonated toluene, sulfonated benzene, sulfonated phenol, sulfonated naphthalenes and benzenes containing alkyl substituents such as methyl, ethyl, isopropyl, butyl, and the like. In each case the addition of the urea has produced a dispersant which is superior to the dispersant obtained without the addition of the urea.

These dispersants, when added in small amounts of a fraction of a per cent, e.g., 0.25 to 0.5% by weight of a cement mix, are effective in reducing viscosity of cement slurries so that they are easily pumpable, in providing more uniform mixes which are easier to handle, and in providing cementing compositions which set with fewer gaps or holes.

The invention is hereby claimed as follows:

1. A process of preparing a water soluble dispersant which comprises adding urea to an aqueous solution of a water soluble sulfonate of a condensation product of formaldehyde and an aromatic sulfonic acid, and heating the resultant mixture, the quantity of urea being sufficient to enhance the effectiveness of said dispersant as an additive to disperse and reduce viscosity in oil well cementing compositions with less retardation in the setting of such cementing compositions as compared with the same compositions to which no urea has been added, said aromatic sulfonic acid being prepared by sulfonating an aromatic compound from the group consisting of alpha-naphthol, beta-naphthol, naphthalene, toluene, benzene, phenol, methyl, ethyl, isopropyl and butyl naphthalenes and alkylated benzenes containing 1-8 carbon atoms in the alkyl substituent groups, said aqueous solution of water soluble sulfonate being neutralized to a pH of 7 to 9, and heated with said urea for at least 2 hours at 70°C. to 90°C., the quantity of urea being within the range of 1 to 5% by weight of said sulfonate.

2. A process as claimed in claim 1 in which said aqueous solution contains 25 to 35% by weight of said sulfonate.

3. A process as claimed in claim 1 in which said water soluble sulfonate is a condensation product of formaldehyde reacted in aqueous solution with a beta-naphthol-sulfonic acid obtained by reacting beta-naphthol with concentrated sulfuric acid at 100°C. to 150°C. with subsequent cooling and addition of water, followed by addition of formaldehyde in a molar ratio of about 0.9 molr per mole of beta-naphthol sulfonic acid and condensation at 90°C. to 100°C., followed by neutralization to a pH of 8 to 9 with sodium hydroxide to produce a sodium sulfonate, followed by addition of 1% to 5% by weight urea based on said sulfonate and heating at 70°C. to 90°C., the amount of water added being such that the resultant aqueoous solution contains approximately 25 to 35% active urea treated beta-naphthol sulfonic acid-formaldehyde condensate sodium salt.

4. The product resulting from the process of claim 1.

5. The product resulting from the process of claim 3.

* * * * *